United States Patent [19]

Schneck

[11] Patent Number: 4,901,241
[45] Date of Patent: Feb. 13, 1990

[54] DEBIT CARD POSTAGE METER

[75] Inventor: Thomas Schneck, San Jose, Calif.

[73] Assignee: Drexler Technology Corporation, Mountain View, Calif.

[21] Appl. No.: 172,693

[22] Filed: Mar. 23, 1988

[51] Int. Cl.[4] .............................................. G07B 17/00
[52] U.S. Cl. ............................... 364/464.02; 235/380; 235/454
[58] Field of Search .............................. 235/380, 454; 364/464.02

[56] References Cited

U.S. PATENT DOCUMENTS

| 3,194,946 | 7/1965 | Rabinow | 235/428 |
|---|---|---|---|
| 3,716,698 | 2/1973 | Simjian | 234/89 |
| 3,938,095 | 2/1976 | Check, Jr. et al. | 364/900 |
| 3,978,457 | 8/1976 | Check, Jr. et al. | 364/200 |
| 4,271,470 | 6/1981 | Dlugos et al. | 364/466 |
| 4,271,481 | 6/1981 | Check, Jr. et al. | 364/900 |
| 4,286,325 | 8/1981 | Dlugos et al. | 364/466 |
| 4,598,196 | 7/1986 | Pierce et al. | 235/454 |
| 4,629,871 | 12/1986 | Scribner et al. | 235/375 |
| 4,719,338 | 1/1989 | Avery et al. | 235/380 |
| 4,809,185 | 2/1989 | Talmadge | 364/464.02 |

Primary Examiner—Parshotam S. Lall
Assistant Examiner—Edward R. Cosimano

[57] ABSTRACT

A postage meter dispensing postage labels corresponding to the consumption of value sites on a debit card. A debit card is inserted into the meter where a card reader/writer cooperates with a label printer. The same optical signal which is used to decrement a value on the card is also used to actuate label printing.

7 Claims, 4 Drawing Sheets

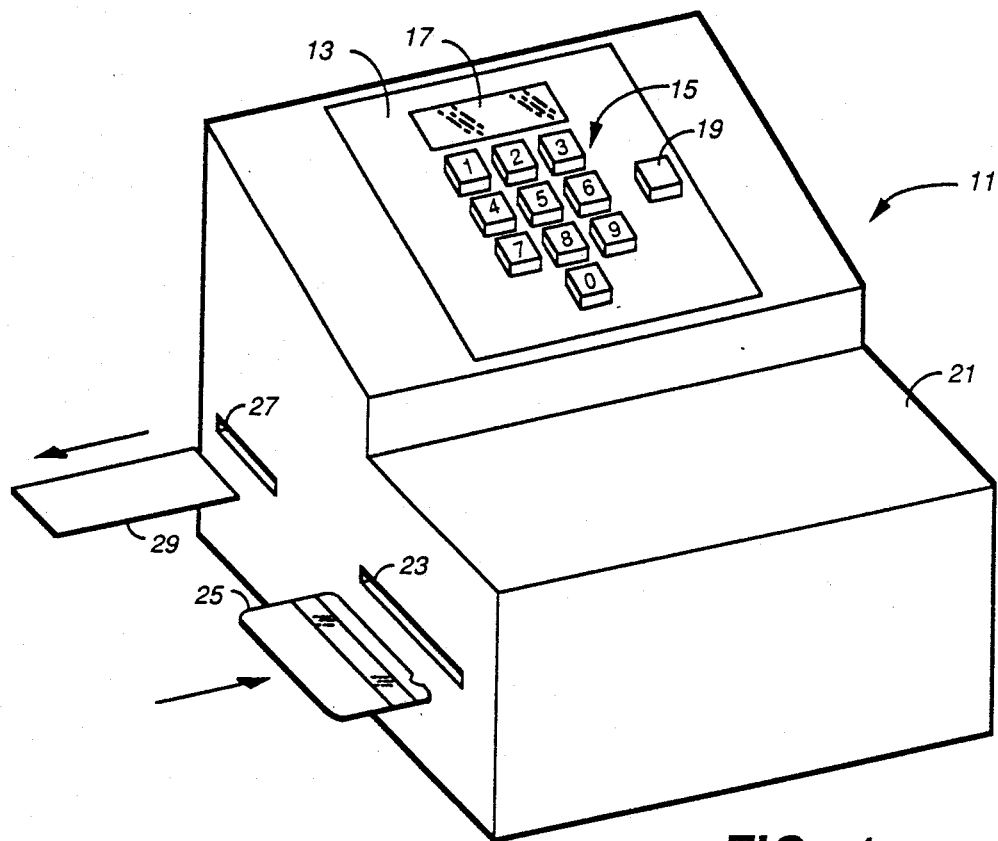
FIG._1.
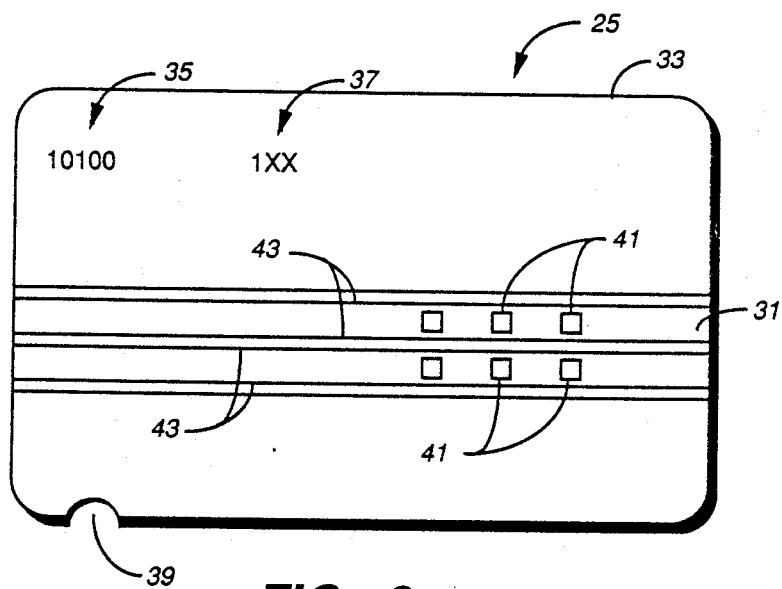
FIG._2.

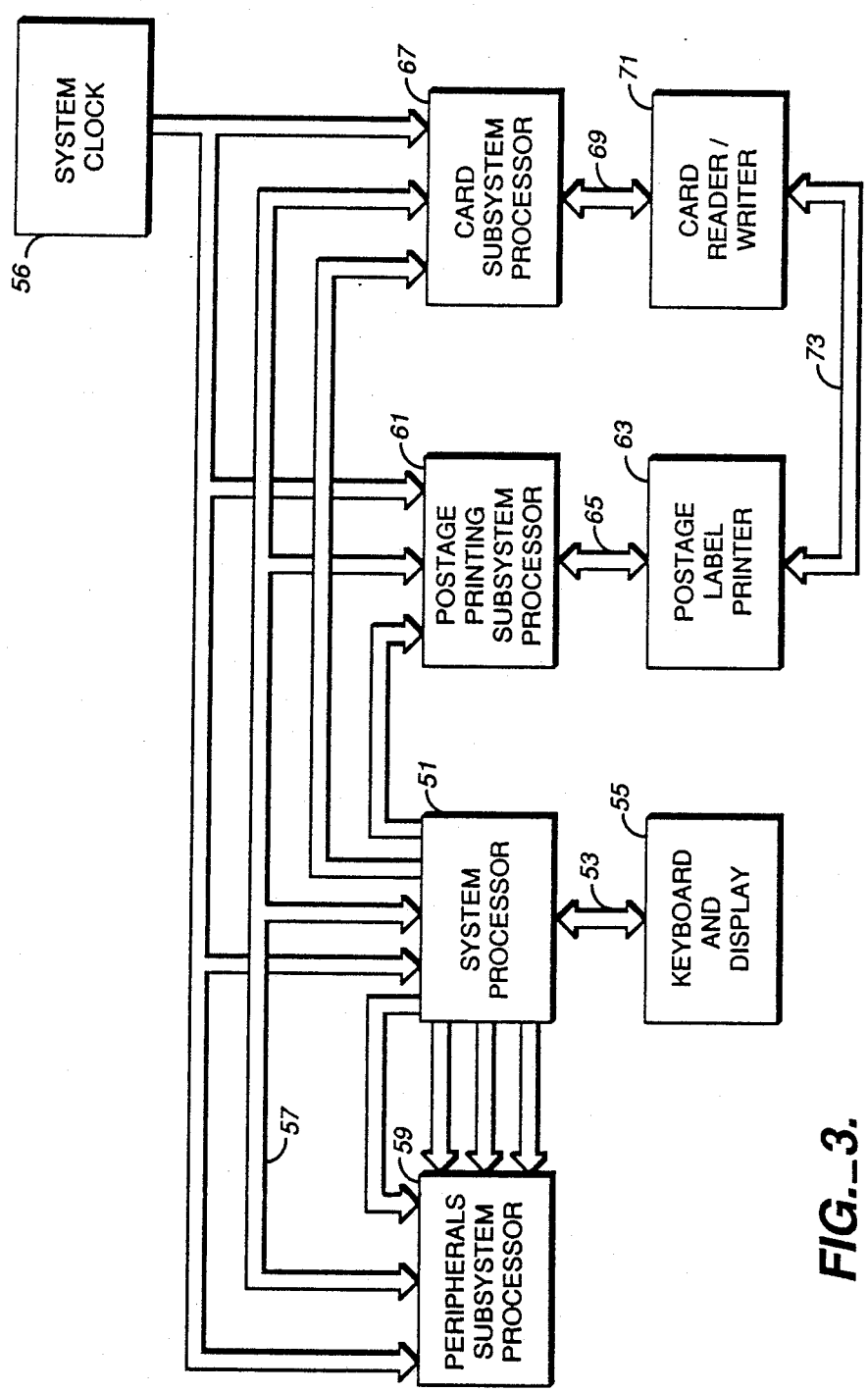
FIG._3.

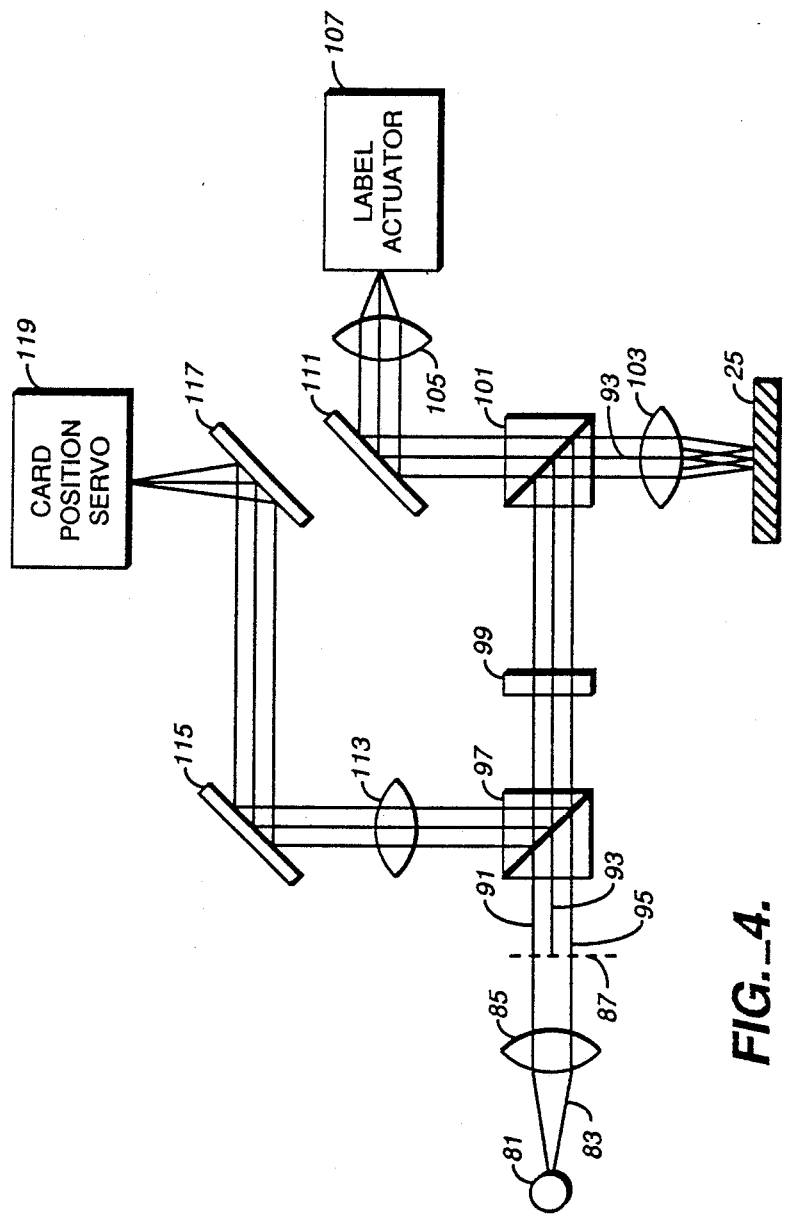
FIG._4.

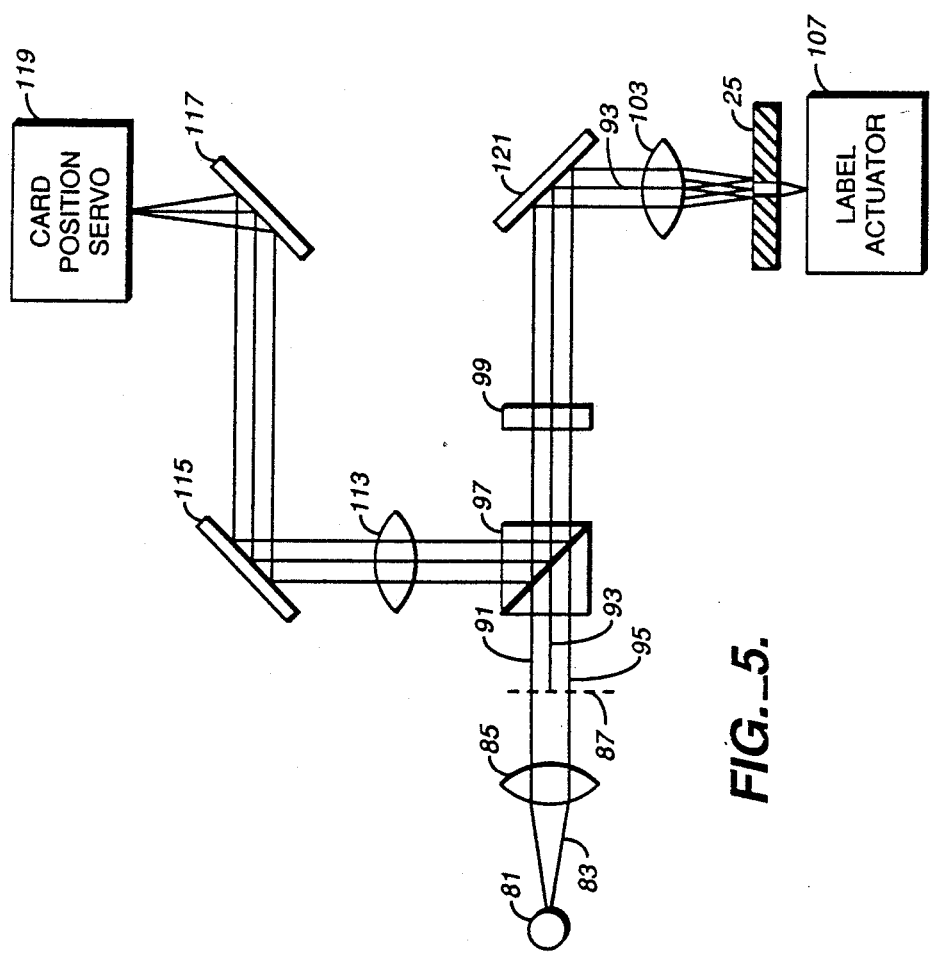
FIG._5.

DEBIT CARD POSTAGE METER

DESCRIPTION Technical Field

1. The invention relates to postage meters and more particularly, to a postage meter operated by means of a debit card.

2. Background Art

The construction of a modern, computer operated postage meter is well understood due to pioneering efforts by Pitney-Bowes Corporation. U.S. Pat. No. 3,938,095 for "Computer Responsive Postage Meter"; U.S. Pat. No. 3,978,457 for "Micro-Computerized Electronic Postage Meter System"; U.S. Pat. No. 4,271,481 for "Micro-Computerized Electronic Postage Meter System", all by F. T. Check, Jr. et al., describe the details of an electronic postage meter.

Conveniently, the prior art discloses that a data bus is available for peripherals, and indeed, prior electronic postage meter patents, such as U.S. Pat. No. 4,286,528 to Dlugos et al., teach a data bus with a peripherals subsystem processor which allows peripheral devices such as a scale to be combined with a postal printer subsystem. The present invention contemplates the addition of a peripheral to the data bus as a substitute for, or an addition to, a postage scale subsystem. See also U.S. Pat. No. 4,271,470 to Dlugos et al. entitled "Serial Data Bus for Use in a Multiprocessor Parcel Postage Metering System". The availability of a data bus gives access to a peripheral subsystems processor and a label printer. The subsystem processor, in turn, is connected to a system processor where overall coordination between a scale, a postage printing system and various peripherals is achieved.

While sophisticated meters are known, and represent a significant advance in the state of the art, their full significance and potential is unrealized. For example, in post offices the principal mechanized approach for selling stamps is a vending machine which dispenses booklets of stamps having fixed denominations. Often this does not provide the needed amount of postage for values beyond common letters or cards.

An example of a situation which may limit the realization of the full potential of electronic postage meters deals with charging systems. Postage meters are typically charged at a postal facility. This requires that the meter be carried to the postal facility, inspected and the system charged by a postal clerk. Although remote charging systems have been devised, these usually require participation of a bank and communications facilities so that the meter can be put into electronic communication with a depository, such as a bank, so that a wire transfer may be made between the bank and the meter. Access to a funds repository by a postage meter is considered by many to be objectionably intrusive and so it is not widely used. Nevertheless, the possibility for such use remains and is being actively promoted. U.S. Pat. No. 4,629,871 to Scribner et al. for an invention entitled "Electronic Postage Meter System Settable by Means of a Remotely Generated Input Device" describes such a system.

Still another example of a situation limiting use of electronic postage meters deals with accounting between various departments in a business having only a single postage meter. In this situation, various departments are required to record postage used by keeping written records or by having a peripheral device as part of the machine. In those instances where time is of the essence and records are not properly maintained, postage values are unaccounted and considered to be lost.

An object of the present invention was to devise a postage value system for a postage meter which would allow members of the public to purchase postage values of any denomination in a public facility, such as a post office.

Another object of the invention was to devise a convenient postage meter charging system which does not require carrying of a meter to a post office or intervention of third parties, such as banks and communications common carriers.

Another object of the invention was to devise a postage value system which had positive accounting for individual users or departments within an organization having a single postage meter.

SUMMARY OF THE INVENTION

The above objects have been met by a postage meter which employs an optical debit card. An optical debit card carries postage values in value sites on a wallet size card. Such value sites may be marks on a card which are removed, as by ablation or by damaging, such as by pitting, or may be marks added to the card such as pits. A debit card is read by a card readerwriter which mechanically receives and advances the card to a proper position. The card is read by scanning value sites with a reading apparatus and then using a writing apparatus to decrement values corresponding to a desired postage. Such a desired postage is entered by an input means. The input means also communicates with a label printer which prints in response to registration of a postal value from the input means. The label printer may be actuated by the writing beam of the reader-writer means so that the same beam which decrements postal values on the debit card also actuates label printing. This has the benefit of positive accounting for postal labels, as required by postal authorities.

An advantage of the present invention is that an optical data card represents a secure carrier of postal values. Unlike magnetic cards, an optical card cannot be altered except by decrementing value after the card is created.

BRIEF DESCRIPTION OF THE DRAWINGS

FIG. 1 is a perspective view of a postage meter in accord with the present invention.

FIG. 2 is a view of a debit card for use with the postage meter of FIG. 1.

FIG. 3 is an electrical block diagram of an electronic postage meter having a data bus.

FIG. 4 is a schematic diagram of a first embodiment of an optical system used with the postage meter of FIG. 1.

FIG. 5 is a schematic diagram of a second embodiment of an optical system used with the postage meter of FIG. 1.

DETAILED DESCRIPTION OF THE INVENTION

With reference to FIG. 1, an electronic postage meter 11 is shown. External components of the meter include a housing 13, a key pad 15 constituting a manual postage input device for setting desired postal values. Above the key pad is a display window 17 where values established by the key pad are shown. An entry key 19 is used for commanding the printing of a label and other buttons, not shown, may be used for special label functions or in connection with setting rates for a postal scale if such a scale is part of a postage meter system. A card subsystem is housed within the card transport compartment 21. At one side of the compartment is a slot 23 having dimensions suitable for accepting an optical data card 25. Housing 13 also includes a second slot 27 from which printed postal labels 29 emerge. The general constructional details of a postage meter are set forth in the above-mentioned patents to Check, Jr. et al. and Dlugos et al.

In the present invention, the card 25 carries value sites which have been prepaid. For example, a card having value sites worth $100.00 would be purchased from postal authorities, typically at a post office. Only such authorities can supply cards to users. By controlling the supply of cards, the security and integrity of the system is assured. The meter may be of the conventional type which is charged with postage value maintained in a local non-volatile internal memory or alternatively, meter may be of the type which has no such memory and merely decrements value sites on the card as individual postage labels are printed. In the former situation the entire value, or significant portions of the value, of a card would be used upon insertion of the card into the meter. In the latter situation, only the amount of value used in printing a postage label is used. Note that now it is not necessary to take the postage meter to the post office for recharging, nor is the intervention of banks and communications common carriers necessary. Only the cards need to be transported by a user and not the meter. Different users, with different cards, may all use the same postage meter. Thus, the meter of the present invention is suitable for use in public places to dispense exact postage for parcels and items requiring odd amounts of postage. Using this system, stamp vending machines would no longer be necessary.

With reference to FIG. 2, card 25 is seen to include an optical recording strip 31 mounted on a card base 33. Such mounting provides the card with an optical data area for value sites and another portion of the card for identification indicia, such as indicia 35 which may either be machine readable or eye readable. Such indicia might be placed on the card for accounting purposes when selling cards, or may be authentication indicia, such as a hologram. Additional indicia 37 may be user provided indicia for the purpose of internal identification within an organization, indicating ownership or the like.

The strip 31 is constructed in accord with U.S. Pat. No. 4,598,196 to G. Pierce et al. for an invention entitled "Debit Card", assigned to assignee of the present invention. In this patent, incorporated by reference herein, servo tracks are provided adjacent to value sites so that precise control of card may be maintained. Additionally, the card may be provided with indicia or features, such as notch 39, which are of assistance in positioning and orienting a card, The materials in construction of the strip are described in the afore-mentioned U.S. Pat. No. 4,598,196. Data cards having an optical recording material of the type suitable for making a debit card is presently sold by Drexler Technology Corporation, Mountain View, California. The strip 31 includes the value sites 41 as well as servo tracks 43. The value sites 41 are to be ablated, damaged or somehow changed as an indication of consumption of value occurring concomitantly with the printing of a label.

With reference to FIG. 3, a block diagram is shown for a computing postage meter of the type described in U.S. Pat. No. 4,271,470 to Dlugos et al. This type of meter includes a central processor 51 which is typically a microcomputer, including memory, a processing unit and communications interfaces. An input and output bus 53 communicates with the keyboard and display 55. A data bus 57 provides bi-directional communication to a peripheral subsystem processor 59 and to a postage printing subsystem processor 61. This processor also contains a microcomputer under the control of system processor 51. The subsystem processor 61 controls postage label printer 63 by bi-directional communication over bus 65. Data bus 57 also links the card subsystem processor 67 with the system processor 51 and the postage printing subsystem processor 61. A system clock 56 feeds timing pulses to processing units 51, 59, 61 and 67.

The card subsystem processor 67 controls the mechanical position of card reader-writer 71. Communication between the card subsystem processor 67 and the card reader-writer 7 is by means of the bi-directional bus 69. The card subsystem processor 67 may also control writing on a data card, i.e. ablation of value sites. However, it is preferable that the same signals, whether electrical or optical, would serve to actuate postage label printer 63 and also actuate ablation or damaging of value sites on a debit card. For this purpose, an electrical or optical signal path 73 is shown and will be discussed below. In other words, to satisfy postal authorities that no unauthorized postage labels have been printed, the present invention contemplates a signaling system wherein the same signal which actuates the label printer 63 also actuates the ablation or damage of value sites on the debit card.

The decrementing of value on a value card, as well as the manner of initiating label printing is shown with reference to FIGS. 4 and 5. A laser 81, which may be a semiconductor laser, generates a moderately intensive beam 83 having an energy of a few milliwatts. The beam is focused by lens 85 onto a diffraction grating 87 where it is split into three spaced apart beams 91, 93 and 95, having an unequal distribution of power. The ratio is about 1:6:1 for the three beams with the middle beam 93 having higher power and the side beams 91 and 95 having lesser power. A beam splitting prism 97 transmits the three beams through a quarter wavelength plate 99 to a beam splitting prism 101 and a tracking lens 103 which controls the position of the three beams in accord with servo information derived from track following optics and a track following subsystem, not shown. The center beam 93 reads or writes the value site track of the card and the two side beams are used to guide beam position on the correct track.

As the beam ablates or damages data spots, the optical signal is reflected from the card and is directed through the beam splitter 101 toward mirror 111, focusing lens 105 and onto label actuator 107 in FIG. 4. Thus, variations in reflected light, upon ablation or damage to a value site are reflected onto a detector cell of label actuator 107 which has a register which counts consumption of value units for determining proper postage to be printed. The same optical signal reflected from card 25 is directed back toward beam splitting prism 97 and through lens 113, mirror 115, mirror 117 and the card positioning servo 119. The card positioning servo contains an array of photodetectors for the purpose of repositioning the beams in response to servo tracking information and the detection of calibration marks and undecremented value sites in the value site area. The intensity of the measured radiation is transmitted as a feedback signal, not shown, which maintains the beams on various track marks. Typically, the detector array provides a servo error signal which is used for repositioning of the focused beam spots.

FIG. 5 is similar to FIG. 4 except that the card base for the value card is transparent except where the optical recording medium is placed. The medium is opaque but thin so that when the medium is ablated at a value site, light will pass through the card onto the label actuator 107. The power of the laser is such that after ablation of a value site, the card is further damaged by the beam so that the card becomes opaque at the value site, such as by means of crazing or by means of pit formation which induces a sufficient amount of light scattering that only a small portion of the beam is transmitted directly through the card. In both FIGS. 4 and 5 the same beam which decrements value on a card also actuates printing of labels. Note that in FIG. 5, the beam splitter 101 is replaced by the mirror 121.

An example of a mechanical card transport for a card reader-writer is shown in FIG. 4 of the aforementioned U.S. Pat. No. 4,598,196. The entirety of said patent is incorporated by reference herein.

The optical debit card of the present invention should be distinguished from security cards, such as authentication cards of the type used with postage meters having values set by other means. While the present card can also accomplish authentication and verification functions, its primary purpose is to bring value sites to the meter with each value site equal to some monetary unit. Thus, the card has representative worth, like money. The card must also be distinguished from a card which is merely a charging card since the present card allows partial decrementing of value so that the card may be inserted into a postage meter repeatedly until all value on a card is consumed. At that point, the card is either captured, destroyed or marked and returned to a user.

What is claimed is:

1. A postage value system for a postage meter comprising,
    an optical, direct read-after-write debit card having card position indicia and a postage value area,
    an optical card reader-writer means for receiving said debit card in a read and write relation,
    a postage meter having manual postage input means for commanding and registering a desired postage value, printing means communicating with the input means for printing on a postal label in response to registrations of postal values from the input means and in response to a signal received from the reader-writer means, said reader-writer means communicating with the postage input means and the printing means, said signal causing decrementation of said desired postal value from the debit card and actuating the printing of said postal value on said postage label, said reader-writer means establishing on said card a permanent record of postage label printing.

2. The postal value system of claim 1 wherein said postage value area comprises a value site area and a user identification area.

3. The postal value system of claim 1 wherein said card reader-writer means comprises a card transport, a beam source and means for moving the card transport relative to the beam.

4. The postal value system of claim 1 wherein said card reader-writer comprises a beam source generating a beam and said printing means is operative by means of a light responsive actuator, said debit card disposed in the optical path between the beam source and the actuator, said debit card having an opaque coating on a transmissive substrate, said card having light penetrable value sites whereby light penetration of value sites permits optical communication with said actuator.

5. The postal value system of claim 1 wherein said card reader-writer means is electrically connected to said postage printing means via a data bus.

6. The postal value system of claim 1 wherein said card reader-writer comprises a beam source and beam splitting optical means for dividing said beam into two portions, including a first beam portion directed onto said debit card and a light responsive actuator in operative cooperation with said printing means, and including a second beam portion directed onto a card positioning means, said first beam portion having an energy sufficient for said decrementing of said desired postal values from said debit card, said first beam portion also actuating said printing means for printing said desired postal values on postage labels concomitantly with said decrementing of said debit card.

7. The postal value system of claim 1 wherein said card reader-writer comprises a beam source and a beam splitting optical means for dividing and directing a first beam portion onto said debit card and a second beam portion onto a card positioning means, the first beam portion having an energy sufficient for said decrementing of value on said debit card, said system further including a light responsive actuator associated with said printing means for reflective reading of said debit card, said light responsive actuator including a register for determining the decremented postal value, the actuator activating said printing means to print the desired and decremented postal value on said postage label.

* * * * *